(12) United States Patent
Yoon

(10) Patent No.: US 7,601,455 B2
(45) Date of Patent: Oct. 13, 2009

(54) LITHIUM RECHARGEABLE BATTERY

(75) Inventor: Jang Ho Yoon, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 892 days.

(21) Appl. No.: 11/272,094

(22) Filed: Nov. 14, 2005

(65) Prior Publication Data

US 2006/0121336 A1    Jun. 8, 2006

(30) Foreign Application Priority Data

Nov. 15, 2004    (KR) ................ 10-2004-0093251

(51) Int. Cl.
*H01M 2/12*    (2006.01)

(52) U.S. Cl. .......................................... 429/72; 429/82
(58) Field of Classification Search ................. 429/72, 429/82, 73, 75, 79, 81, 85, 86, 53, 61, 7
See application file for complete search history.

(56) References Cited

FOREIGN PATENT DOCUMENTS

JP    2004103250    4/2004

*Primary Examiner*—Patrick Ryan
*Assistant Examiner*—Monique Wills
(74) *Attorney, Agent, or Firm*—H.C. Park & Associates, PLC

(57) ABSTRACT

A lithium rechargeable battery includes a bimetal and a current interruption means that is actuated by the inner pressure or heat generated from within the rechargeable battery in the case of an abnormal operation thereof to interrupt the flow of current for improved stability of the lithium rechargeable battery.

34 Claims, 10 Drawing Sheets

LITHIUM RECHARGEABLE BATTERY

CROSS REFERENCE TO RELATED APPLICATION

This application claims priority to and the benefit of Korean Patent Application No. 10-2004-0093251 filed on Nov. 15, 2004, which is hereby incorporated by reference for all purposes as if fully set forth herein.

BACKGROUND OF THE INVENTION

1. Field of the Invention

The present invention relates to a lithium rechargeable battery that includes a current interruption means comprising a bimetal that is actuated by the inner pressure or heat that is generated from within the rechargeable battery in the case of a malfunction to interrupt the flow of current for improved stability of the battery.

2. Description of the Background

Lithium rechargeable batteries are classified into cylindrical lithium rechargeable batteries and rectangular-box type lithium rechargeable batteries based on their external appearance. The cylindrical lithium rechargeable batteries have a cap assembly that interrupts the current within the rechargeable batteries when the internal pressure of the batteries rises above a predetermined level and there is a danger of explosion due to overcharge or malfunction. In addition, the current may be interrupted to suppress any further reaction for improved safety of the lithium rechargeable batteries.

The structure of a cap assembly of such cylindrical lithium rechargeable batteries is disclosed in Korean Patent No. 10-0357950. The cylindrical lithium rechargeable battery includes a cylindrical can and a cap assembly that is hermetically coupled to the top opening of the can with an insulation gasket interposed between them. The cylindrical can contains an electrode assembly that is formed by winding a positive electrode plate and a negative electrode plate into a jelly roll with a separator inserted between them, and an electrolyte.

The cap assembly may include a safety vent, a current interruption means, a secondary protective device, and a terminal cap (also referred to as a cap-up). The safety vent may have a plate shape and is positioned below the cap assembly. The safety vent has a protrusion that is formed at the center thereof while protruding downward such that the protrusion is deformed upward by the pressure that is generated from within the rechargeable battery. An electrode tab is drawn from the positive electrode plate and the negative electrode plate of the electrode assembly. For example, the positive electrode tab that is drawn from the positive electrode plate is welded to the lower surface of the safety vent in a predetermined position to couple the safety vent to the positive electrode plate. The negative electrode plate may be directly coupled to the can or coupled via a tab.

The current interruption means is positioned on top of the safety vent and allows current to flow to the secondary protective device via the safety vent. If the battery malfunctions or its internal pressure rises above a predetermined level, the protrusion of the safety vent deforms upward and is destroyed by the current interruption means. The flow of current is then interrupted.

Conventional current interruption means may include a circular outer ring, a bar that extends through the center of the outer ring, an insulated print board that is positioned at the center of the bar and has a via hole formed thereon, and conductive films that are positioned on the upper and lower portions of the insulated print board. A side of an upper conductive film is connected to the outer ring of the insulated print board and the other side thereof is not connected thereto. In contrast, a end of a lower conductive film is not connected to the outer ring and the other end thereof is also connected thereto. The via hole has a conductive layer formed thereon which is made of a conductive metal such as copper to couple the upper and lower conductive films to each other.

The bar has fracture portions that are formed on both lateral surfaces of the portion on which the via hole is formed so that the bar can easily be fractured.

The current interruption means is positioned to contact the protrusion of the safety vent and extends through the via hole. If the protrusion of the safety vent protrudes upward, the resulting force fractures the bar of the current interruption means about the via hole. The electrical connection between the conductive layer within the via hole and the upper or lower conductive film is then broken. As such, the current interruption means are adapted to interrupt the current between the safety vent and the secondary protective device.

However, conventional current interruption means are problematic because although the conductive layer that is formed within the via hole is supposed to be completely separated from the upper or lower conductive films when the bar is fractured by the safety vent, the conductive layer sometimes fails to be completely separated because it is made of a ductile metal such copper. Specifically, the conductive layer may stretch due to ductility while still being coupled with the upper and lower conductive films even when the bar has been fractured, and fails to separate the upper and lower conductive films from each other. The rechargeable battery then continues to undergo chemical reactions and may explode.

Furthermore, conventional current interruption means are actuated only when the protrusion of the safety vent is inverted by the internal pressure of the rechargeable battery. Thus, it may fail to interrupt the flow of current in the rechargeable battery unless equipped with a separate secondary protective device that reacts to temperature changes.

SUMMARY OF THE INVENTION

The present invention provides a lithium rechargeable battery that includes a current interruption means comprising a bimetal that is actuated by the inner pressure or heat that is generated from within the rechargeable battery in the case of a malfunction to interrupt the flow of current for improved stability of the lithium rechargeable battery.

Additional features of the invention will be set forth in the description which follows, and in part will be apparent from the description, or may be learned by practice of the invention.

The present invention discloses a lithium rechargeable battery that includes a cap assembly including a cap-up, a safety vent that has a protrusion that protrudes downward from the center thereof. The safety vent can be deformed upward by the internal pressure of the battery. The lithium rechargeable battery also includes a current interruption means that is positioned on top of the safety vent. The current interruption means includes an outer ring that is made up of conductive metal and a bimetal that extends across the top of the protrusion. The bimetal has one end coupled with the outer ring and the other end being coupled with the top surface of the safety vent. In addition, the battery includes an insulation plate that has a size corresponding to the protrusion of the safety vent and is positioned on top of the protrusion, and an insulating ring that is positioned in between the safety vent and the outer ring with a predetermined height while being spaced at a predetermined distance from the outer end of the insulation plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3b is a sectional view taken along line A-A of FIG. 3a.

FIG. 4b is a sectional view taken along line B-B of FIG. 4a.

FIG. 13b is a sectional view taken along line C-C of FIG. 13a.

DETAILED DESCRIPTION OF THE ILLUSTRATED EMBODIMENTS

Figure 1:
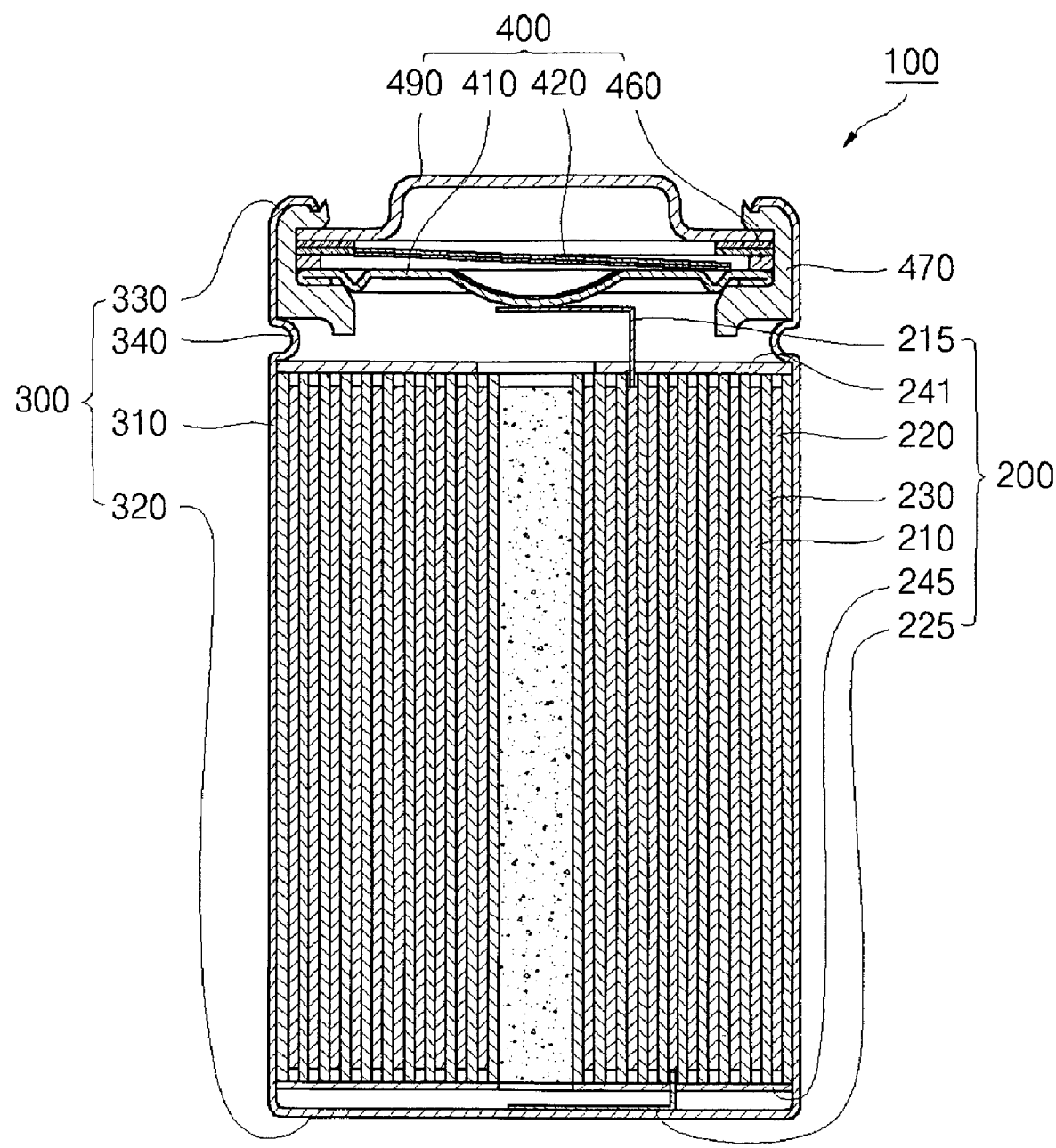
FIG. 1 is a sectional view of a cylindrical rechargeable battery according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

According to the lithium rechargeable battery of the present invention, the current interruption means used in the cap assembly of the battery includes a bimetal that is actuated by the internal pressure or heat generated from within the rechargeable battery in the case of abnormal battery function. This allows it to more effectively interrupt the flow of current for improved safety of the lithium rechargeable battery. In addition, the actuation of the current interruption means by heat or internal pressure reduces the dispersion of current interruption of the current interruption means and improves the reliability of the battery.

Figure 2:
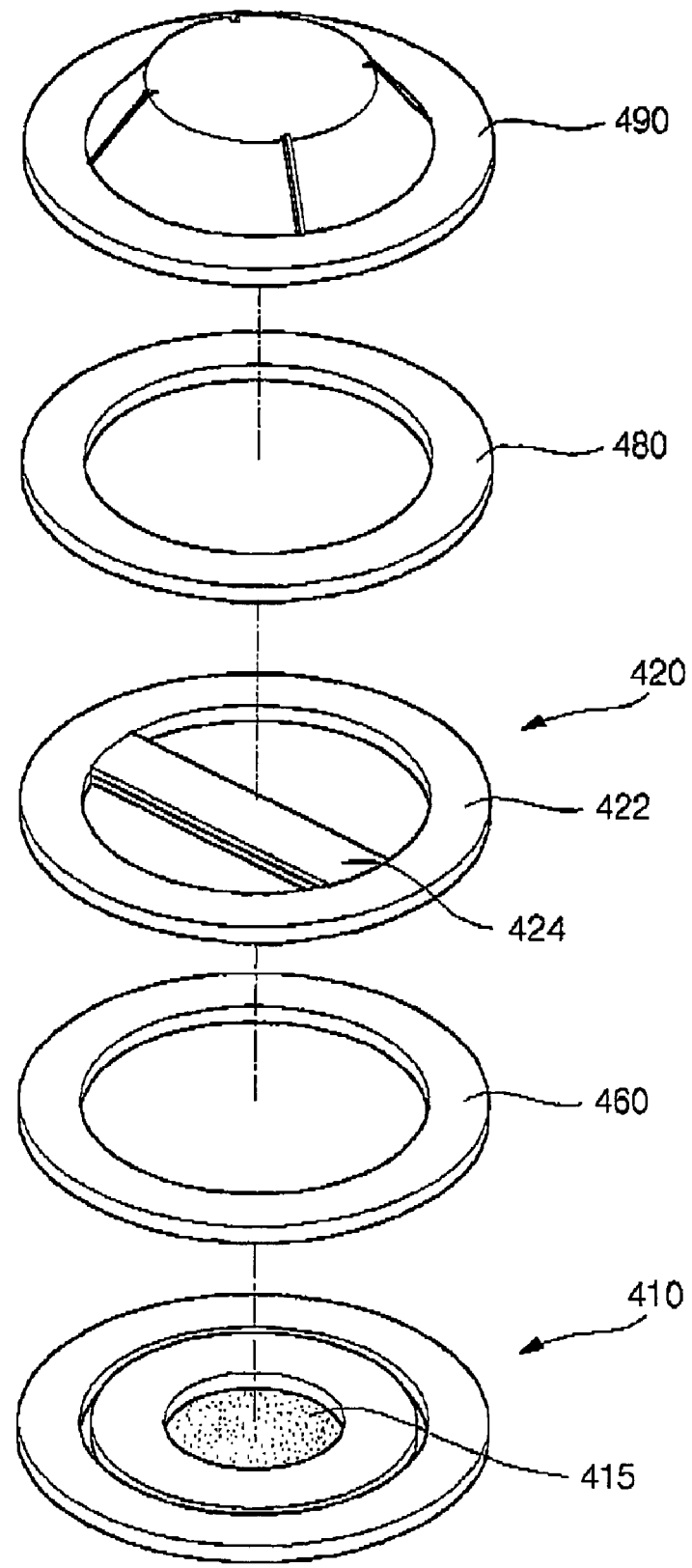
FIG. 2 is an exploded perspective view of a cap assembly of a cylindrical rechargeable battery according to an exemplary embodiment of the present invention.
Figure 3A:
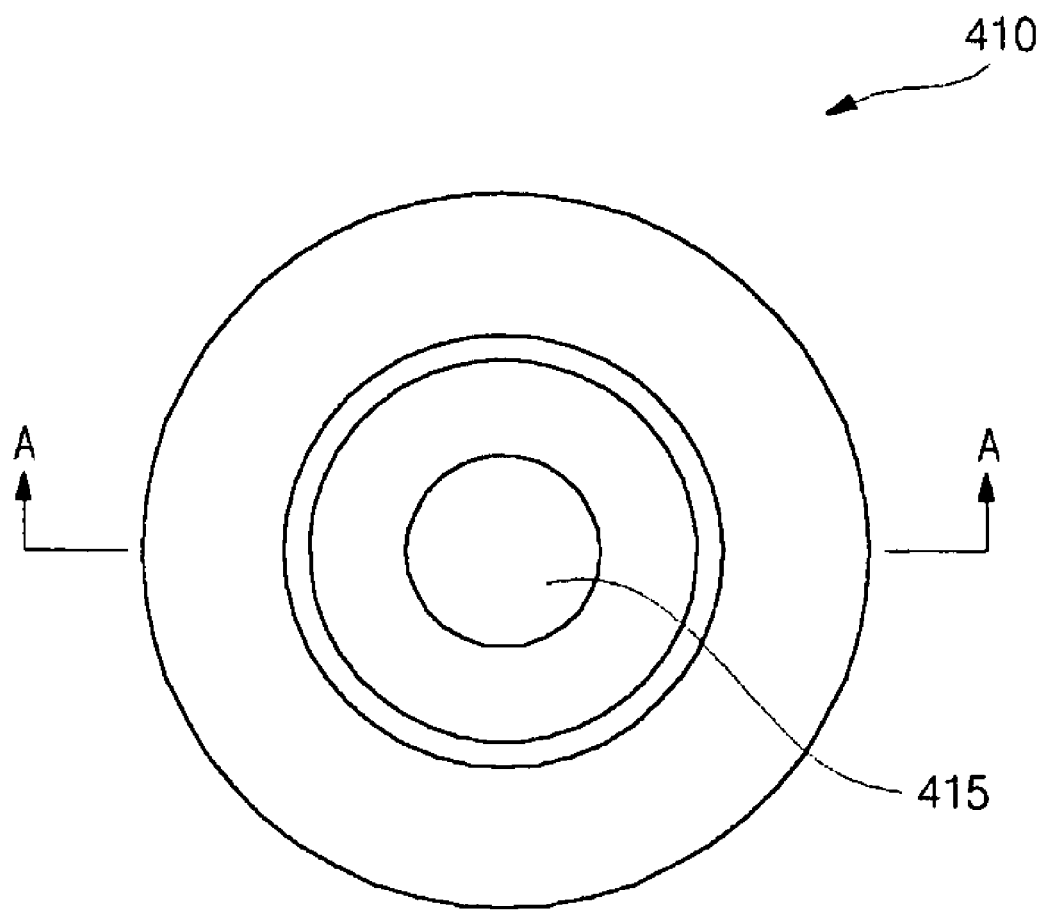
FIG. 3a is a top view of a safety vent according to an exemplary embodiment of the present invention.
Figure 3B:
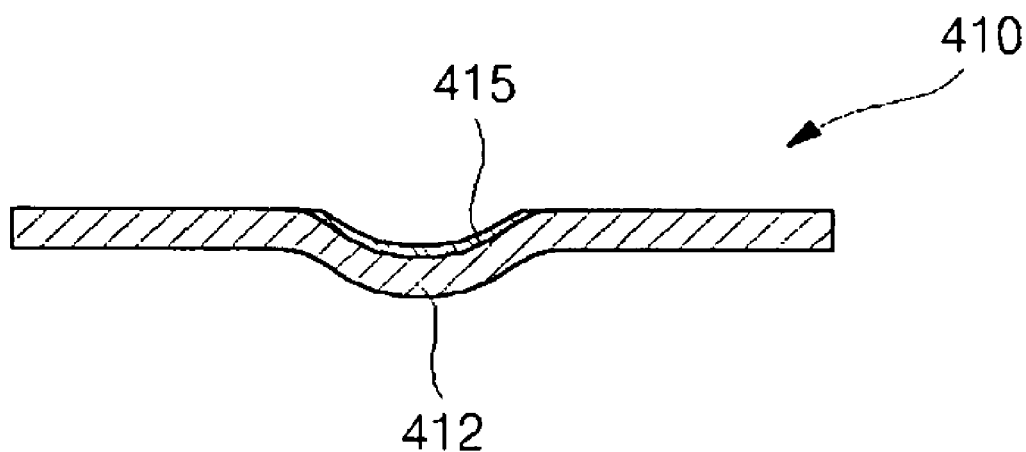
Figure 4A:
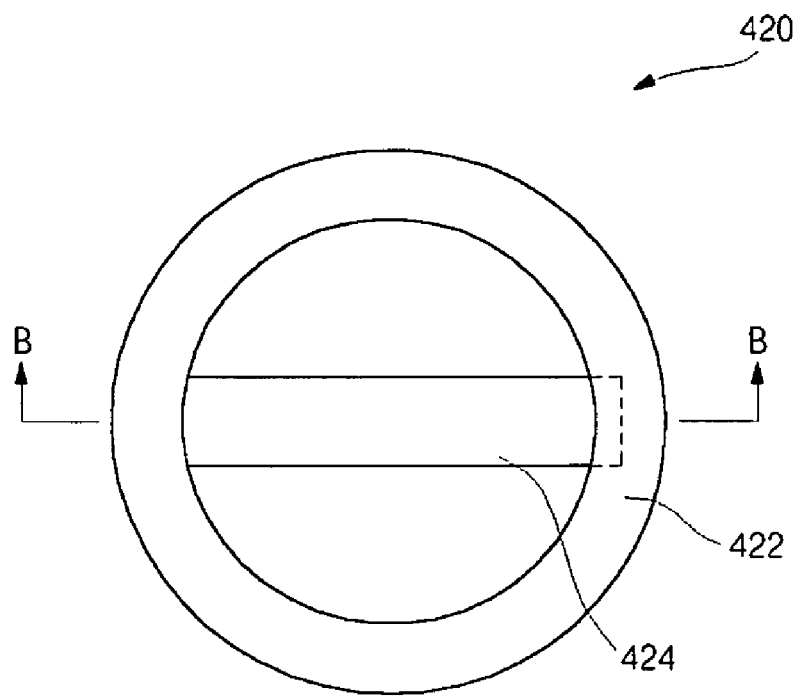
FIG. 4a is a top view of a current interruption means according to an exemplary embodiment of the present invention.
Figure 4B:
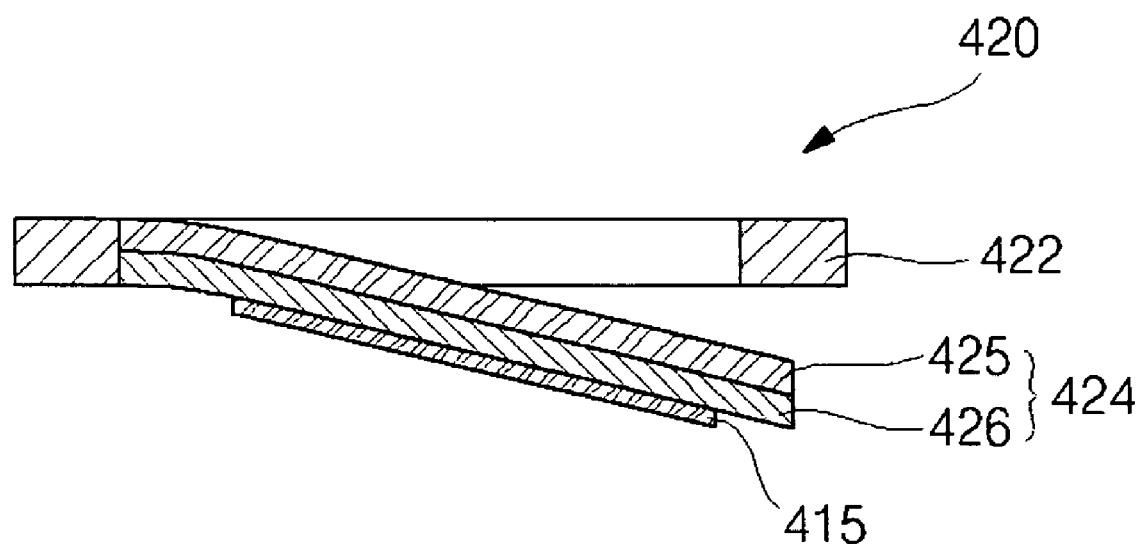
Figure 5:
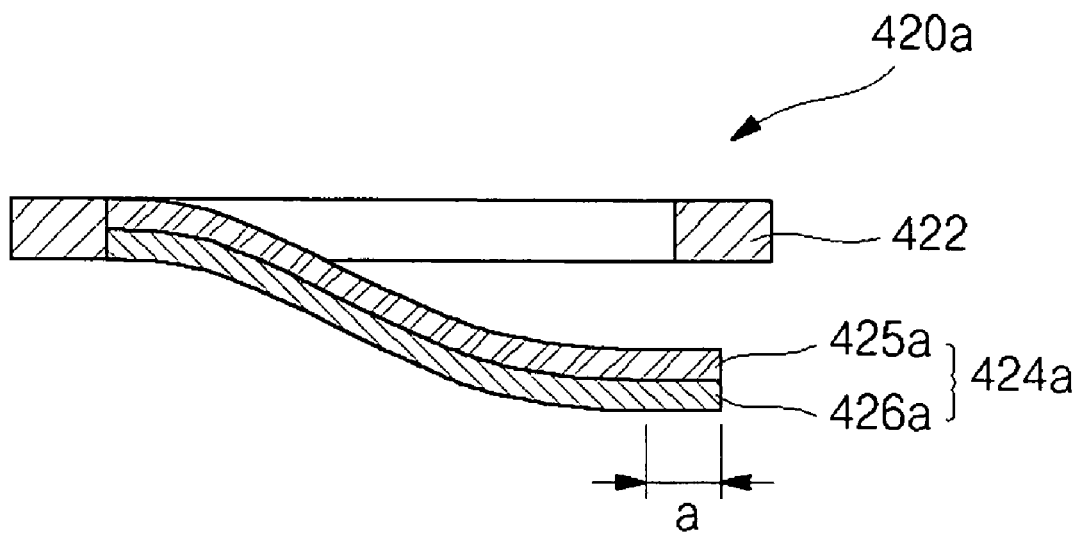
FIG. 5 is a sectional view of a current interruption means according to another exemplary embodiment of the present invention.
Figure 6:
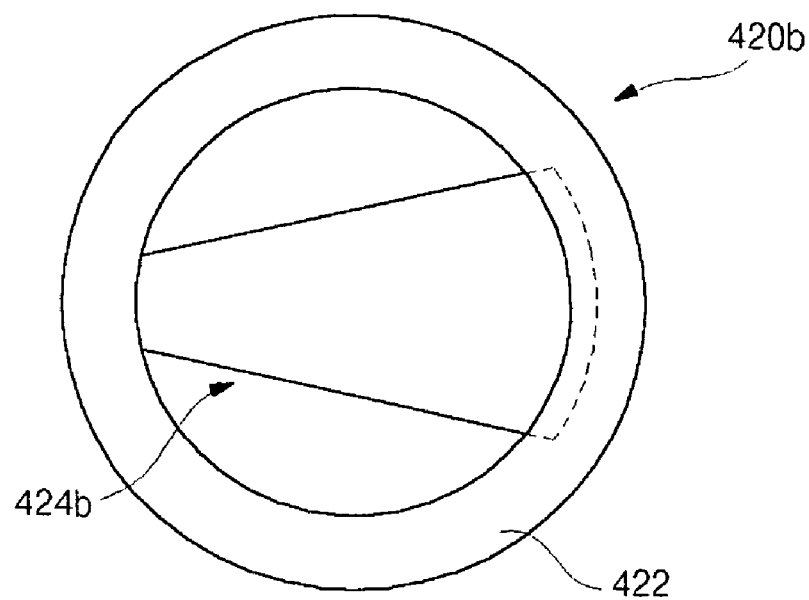
FIG. 6 is a top view of a current interruption means according to another exemplary embodiment of the present invention.
Figure 7:
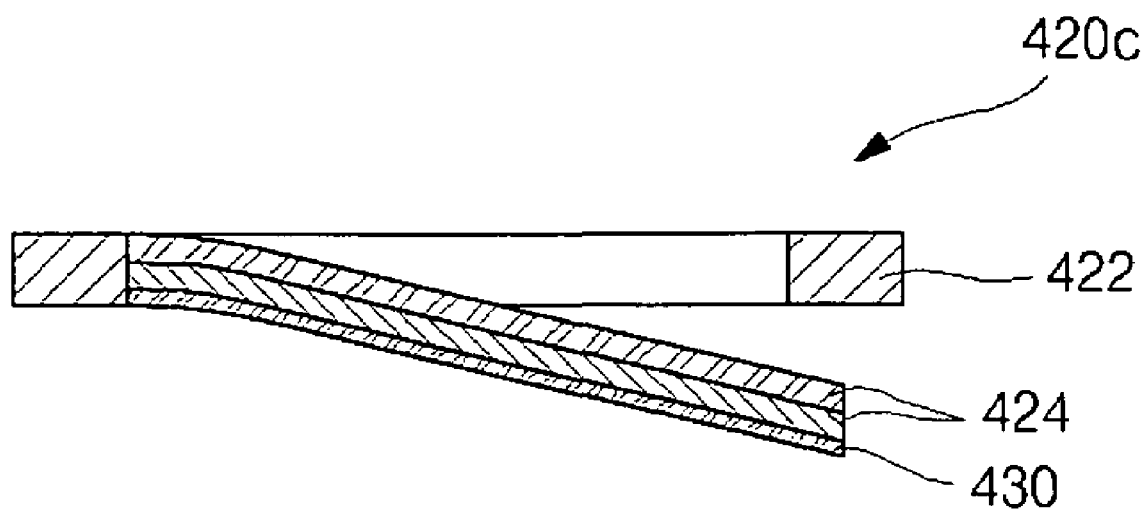
FIG. 7 is a sectional view of a current interruption means according to another exemplary embodiment of the present invention.
Figure 8:
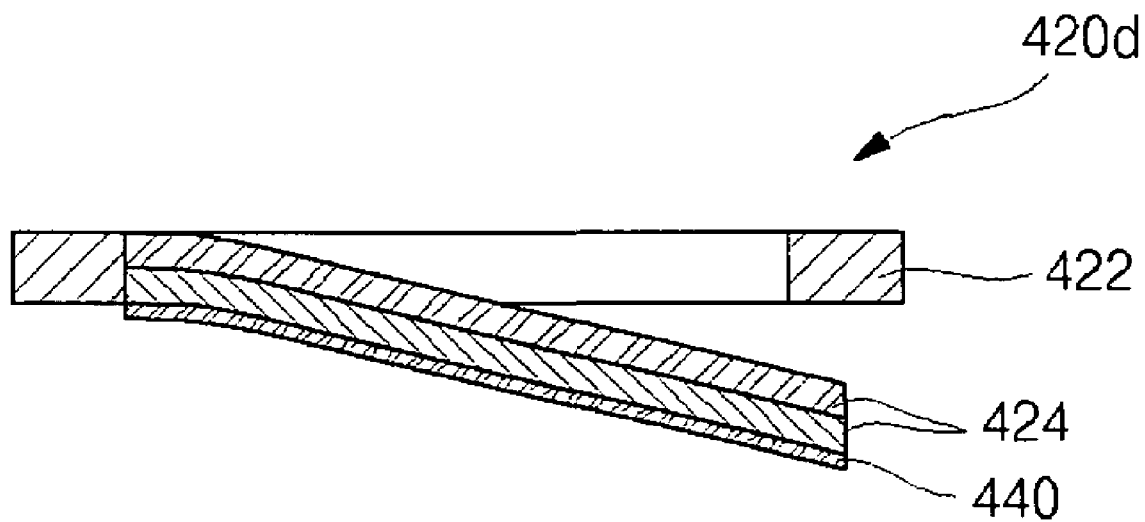
FIG. 8 is a sectional view of a current interruption means according to another exemplary embodiment of the present invention.
Figure 9:
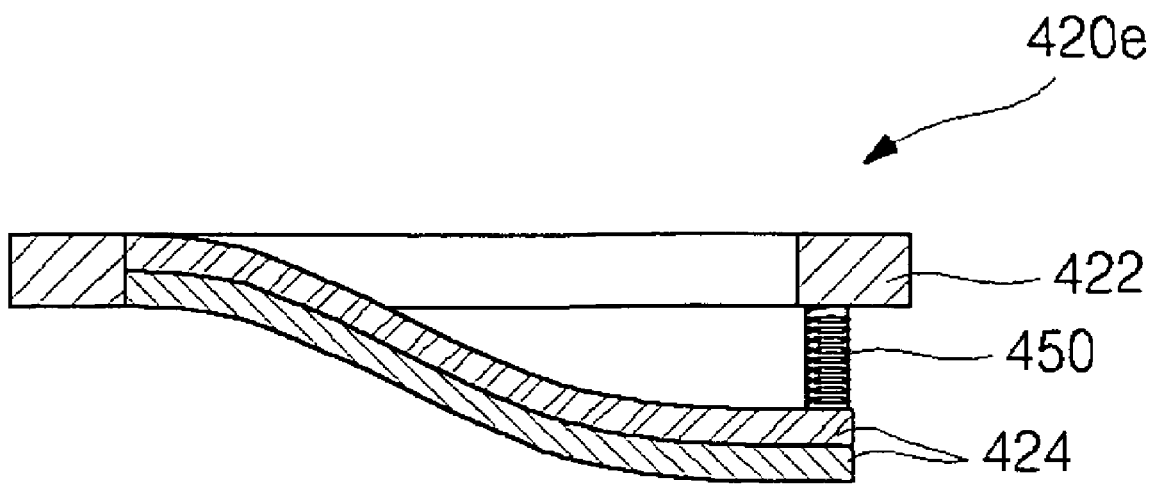
FIG. 9 is a sectional view of a current interruption means according to another exemplary embodiment of the present invention.
Figure 10:
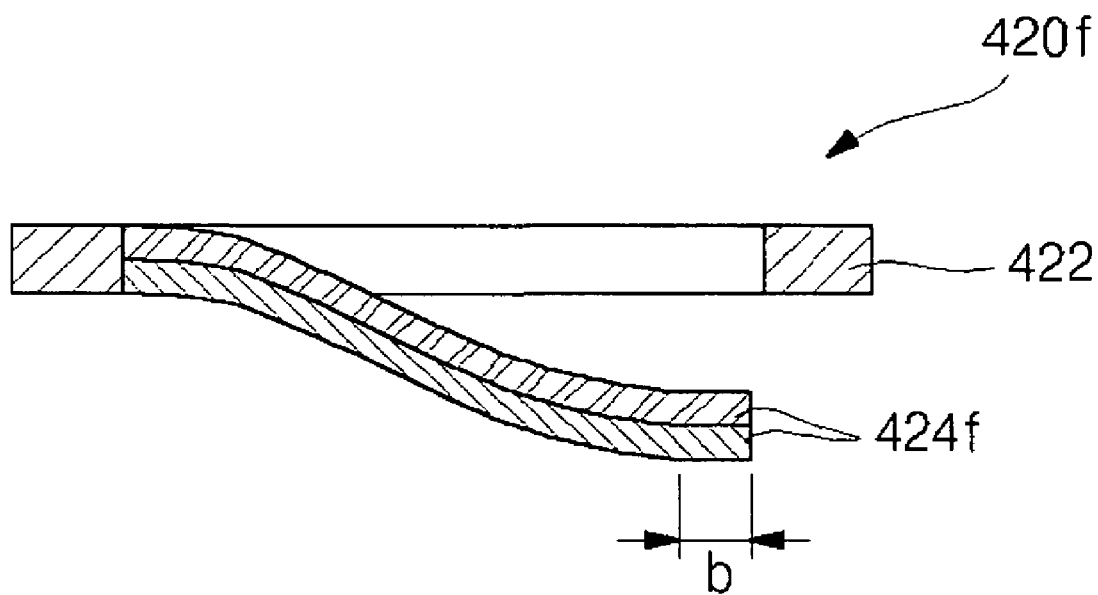
FIG. 10 is a sectional view of a current interruption means according to another exemplary embodiment of the present invention.
Figure 11:
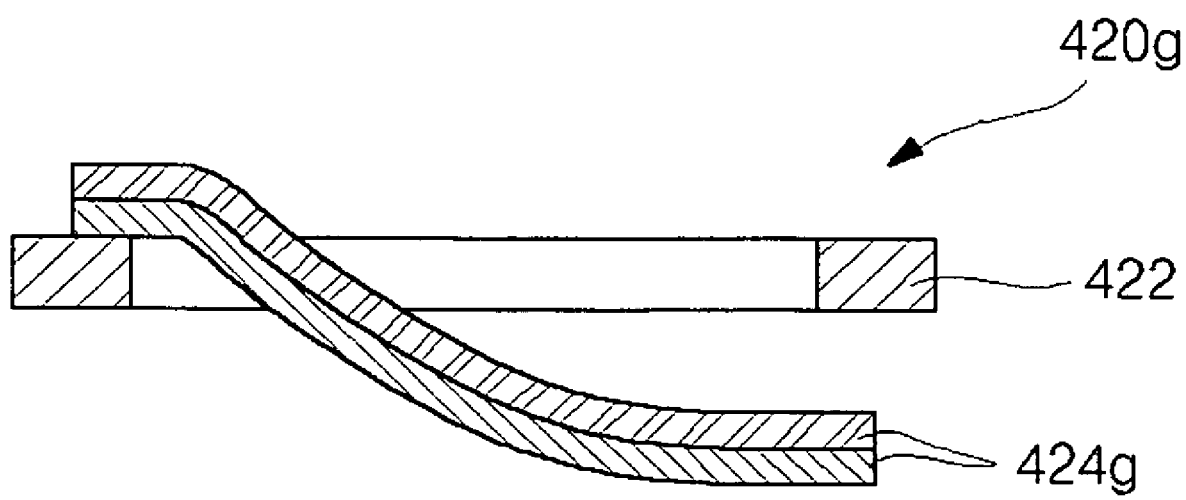
FIG. 11 is a sectional view of a current interruption means according to another exemplary embodiment of the present invention.
Figure 12:
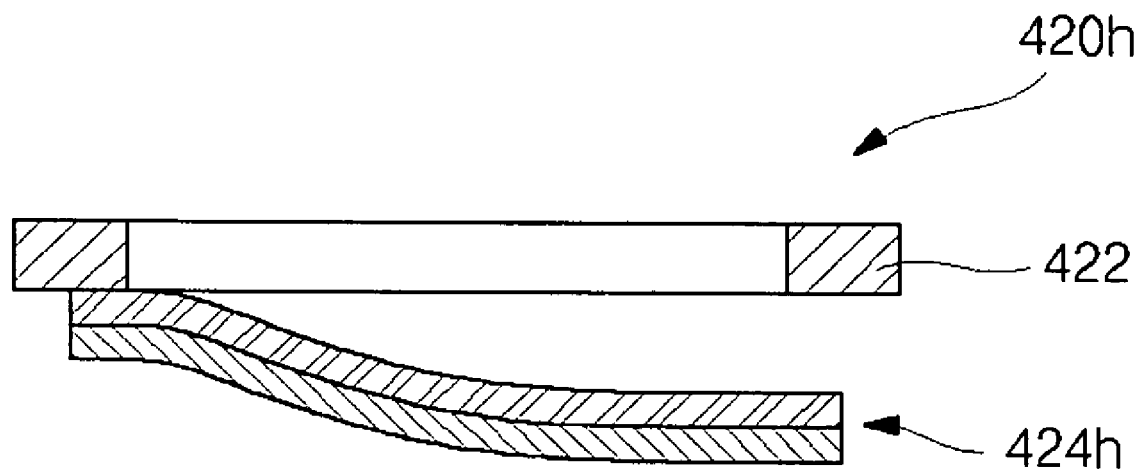
FIG. 12 is a sectional view of a current interruption means according to another exemplary embodiment of the present invention.
Figure 13A:
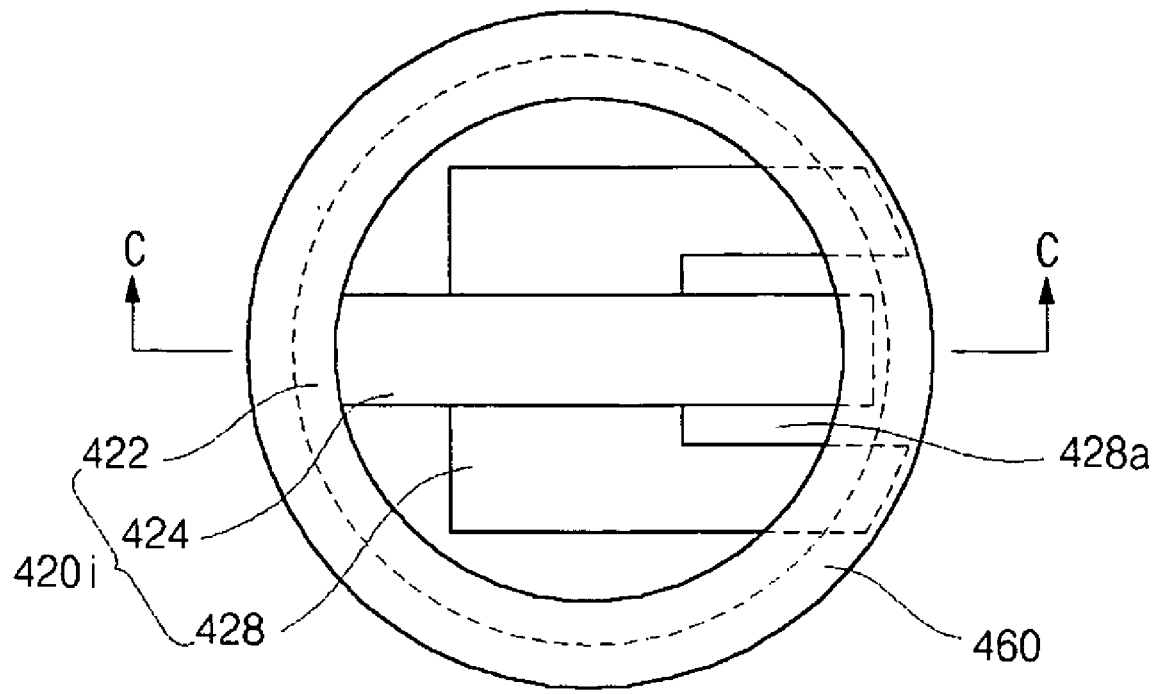
FIG. 13a is a top view of a current interruption means according to another exemplary embodiment of the present invention.
Figure 13B:
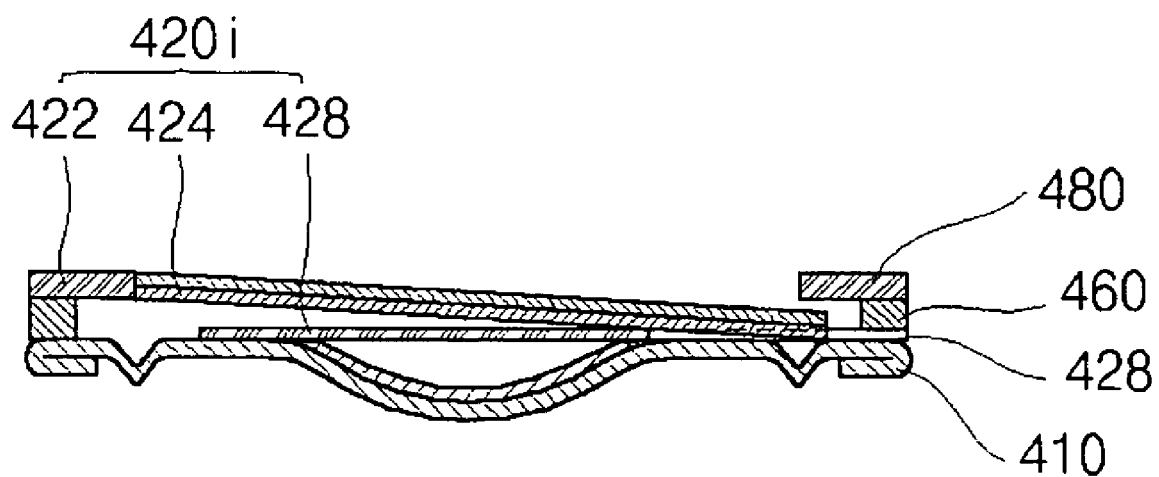
Figure 14:
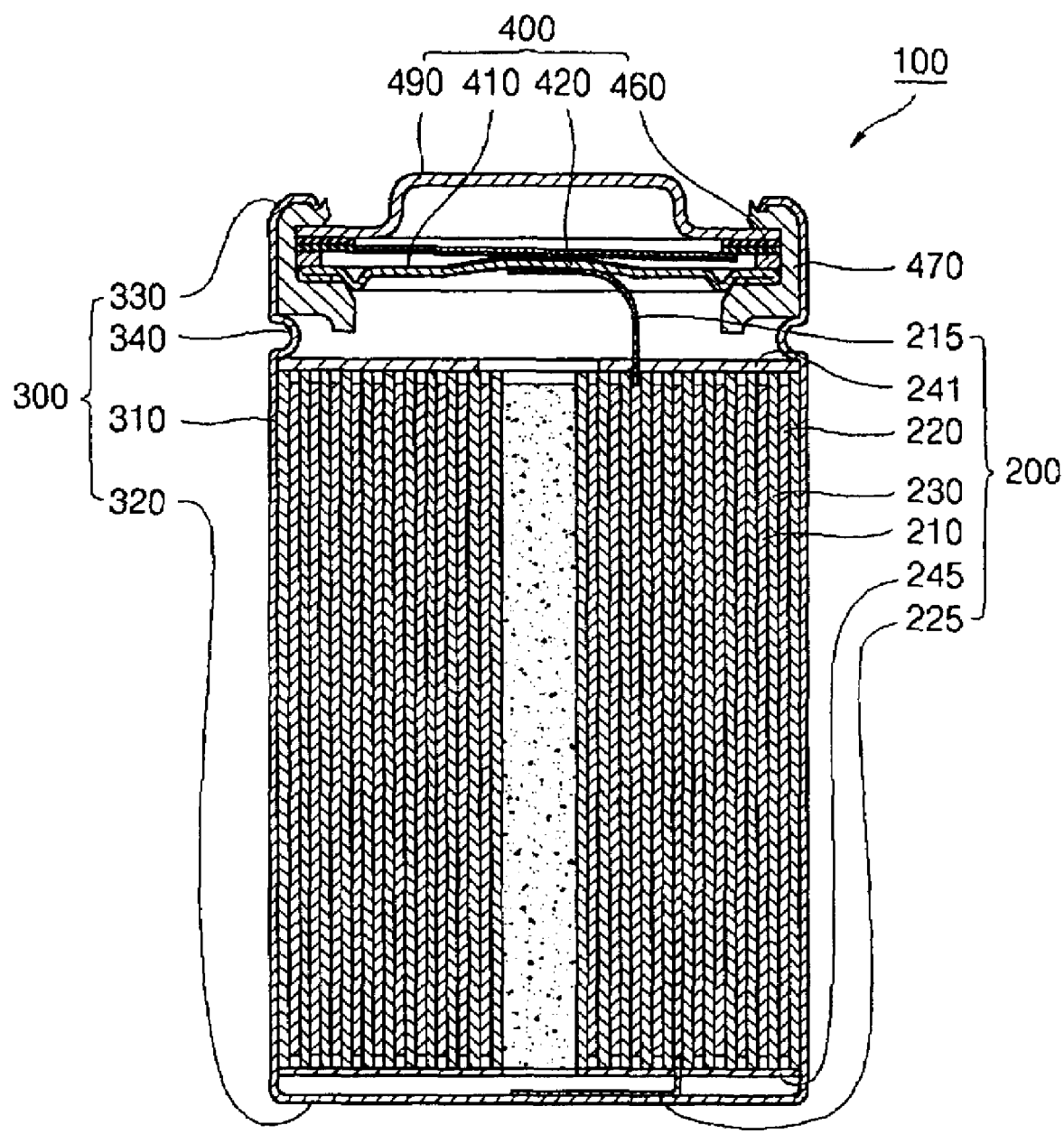
FIG. 14 is a sectional view of a lithium rechargeable battery showing the operation of a current interruption means according to an exemplary embodiment of the present invention.

FIG. 1 is a sectional view of a cylindrical rechargeable battery according to an exemplary embodiment of the present invention. FIG. 2 is an exploded perspective view of a cap assembly of a cylindrical rechargeable battery according to an exemplary embodiment of the present invention. FIG. 3a is a top view of a safety vent according to an exemplary embodiment of the present invention. FIG. 3b is a sectional view taken along line A-A of FIG. 3a. FIG. 4a is a top view of a current interruption means according to an exemplary embodiment of the present invention. FIG. 4b is a sectional view taken along line B-B of FIG. 4a. FIG. 5 is a sectional view of a current interruption means according to another exemplary embodiment of the present invention. FIG. 6 is a top view of a current interruption means according to another exemplary embodiment of the present invention. FIG. 7 is a sectional view of a current interruption means according to another exemplary embodiment of the present invention. FIG. 8 is a sectional view of a current interruption means according to another exemplary embodiment of the present invention. FIG. 9 is a sectional view of a current interruption means according to another exemplary embodiment of the present invention. FIG. 10 is a sectional view of a current interruption means according to another exemplary embodiment of the present invention. FIG. 11 is a sectional view of a current interruption means according to another exemplary embodiment of the present invention. FIG. 12 is a sectional view showing a current interruption means according to another exemplary embodiment of the present invention. FIG. 13a is a top view of a current interruption means according to another exemplary embodiment of the present invention. FIG. 13b is a sectional view taken along line C-C of FIG. 13a. FIG. 14 is a sectional view of a lithium rechargeable battery showing the operation of a current interruption means according to an exemplary embodiment of the present invention.

A cylindrical lithium rechargeable battery 100 according to an exemplary embodiment of the present invention as shown in FIG. 1 includes an electrode assembly 200, a cylindrical can 300 for housing the electrode assembly 200 and an electrolyte, and a cap assembly 400 that is coupled with the top of the cylindrical can 300 to seal it. The cap assembly 400 allows current that is generated from the electrode assembly 200 to flow to an external apparatus.

The electrode assembly 200 is formed by winding a positive electrode plate 210 having a positive electrode coated portion formed on a surface of a positive electrode collector, a negative electrode plate 220, having a negative electrode coated portion formed on a surface of a negative electrode collector, and a separator 230 positioned in between the positive electrode plate 210 and the negative electrode plate 220 to insulate them from each other. Although it is not shown in detail in FIG. 1, the positive electrode plate 210 includes a positive electrode collector made of a thin metal plate that has excellent conductivity such as aluminum (Al) foil, and positive electrode coated portions that are formed on both surfaces thereof. The positive electrode plate 210 has positive electrode uncoated areas formed on both ends thereof that correspond to predetermined areas of the positive electrode collector that have no positive electrode coated portion formed thereon. The positive electrode uncoated areas have a positive electrode tab 215 that is bonded to an end thereof, which generally comprises aluminum (Al) and protrudes a predetermined length from the top of the electrode assembly 200.

The negative electrode plate 220 includes a negative electrode collector comprising a thin conductive metal plate such as copper (Cu) or nickel (Ni) foil, and negative electrode coated portions that are formed on both surfaces thereof. The negative electrode plate 220 has negative electrode uncoated areas formed on both ends thereof that correspond to predetermined areas of the negative electrode collector that have no negative electrode coated portion formed thereon. The negative electrode uncoated areas have a negative electrode tab 225 bonded to an end thereof, which generally comprises nickel (Ni) and protrudes a predetermined length from the bottom of the electrode assembly 200. The electrode assembly 200 may additionally include insulation plates 241 and 245 that are positioned on the top and bottom thereof to avoid contact with the cap assembly 400 or the cylindrical can 300, respectively.

The cylindrical can 300 includes a cylindrical lateral plate 310 that has a predetermined diameter to define a predetermined space in which the cylindrical electrode assembly 200 can be contained and a bottom plate 320 for sealing the bottom of the cylindrical lateral plate 310. The top of the cylindrical lateral plate 310 is open so that the electrode assembly 200 can be inserted through it. The negative electrode tab 225 of the electrode assembly 200 is coupled with the center of the bottom plate 320 of the cylindrical can 300 so that the cylindrical can 300 may itself act as a negative electrode. The cylindrical can 300 generally comprises aluminum (Al), iron (Fe), or an alloy thereof. The cylindrical can 300 has a clipping portion 330 that is bent inward from the top thereof, in order to compress the top of the cap assembly 400 that is coupled with the top opening of the cylindrical can 300. The cylindrical can 300 also has a beaded portion 340 that is dented inward and is spaced at a distance corresponding to the thickness of the cap assembly 400 from below the clipping portion 330 in order to compress the bottom of the cap assembly 400.

The cap assembly 400, referring to FIG. 2, includes a safety vent 410, an insulation plate 415, a current interruption means 420, an insulation ring 460, a secondary protective device 480, and a cap-up 490. The current interruption means 420 according to the present invention interrupts current with the heat generated from within the rechargeable battery so the secondary protective device 480 may be omitted. After a separate gasket is coupled with the exterior of the cap assembly 400, the cap assembly 400 may be coupled with the top of the cylindrical can 300 to seal it and transmit the current generated from the electrode assembly 200 to an external apparatus.

The safety vent 410, referring to FIG. 3a and FIG. 3b, comprises conductive metal and has the shape of a circular plate. The safety vent 410 has a protrusion 412 that protrudes downward from the center thereof The safety vent 410 preferably comprises aluminum-based metal or nickel-based metal. The safety vent 410 is positioned below the cap assembly 400. The positive electrode tab 215 is coupled with the bottom surface of the safety vent 410, and is preferably coupled with the protrusion 412 by welding. The protrusion 412 of the safety vent 410 protrudes downward and is inverted upward when the internal pressure of the lithium rechargeable battery rises due to overcharging/over-discharging or abnormal heating.

The insulation plate 415 has a size corresponding to the protrusion 412 of the safety vent 410 and is positioned on top of the protrusion 412 to prevent it from contacting the current interruption means 420, the secondary protective device 480, and the cap-up 490 when it is inverted and protrudes upward. The insulation plate 415 preferably comprises an insulation tape and is coupled with the top surface of the protrusion 412 of the safety vent 410 as shown in FIG. 3a and FIG. 3b. The insulation plate 415 may also be coupled with a portion of the bottom surface of a bimetal 424 that corresponds to the protrusion 412. As such, the insulation 415 is not displaced and it insulates the protrusion 412 even when the protrusion 412 protrudes upward. The insulation plate 415 may comprise a material including, but not limited to polypropylene, polyimide, polyphenylene sulfide, and Nylon 66. In general, the insulation plate 415 may comprise a material that does not react with the electrolyte used in the lithium rechargeable battery and has a melting point that is higher than 110° C. (i.e., the temperature at which the lithium rechargeable battery begins to function abnormally).

The insulation ring 460 is a ring that comprises an insulation material and has an outer diameter that corresponds to the outer diameter of the safety vent 410, an inner diameter that is spaced at a predetermined distance from the other end of the bimetal 424, and a predetermined thickness. The insulation ring 460 is positioned in between the safety vent 410 and the outer ring 422 of the current interruption means 420 to prevent current from flowing between them. The insulation ring 460 may be thinner than the vertical distance between the bottom surface of the outer ring and the bottom surface of the other end of the bimetal 424 to allow the other end of the bimetal 424 to contact the top surface of the safety vent 410. The insulation ring 460 may comprise a material including, but not limited to polypropylene, polyimide, polyphenylene sulfide, Nylon 66, and those that do not react with the electrolyte used in the lithium rechargeable battery and have a melting point that is higher than 110° C.

The secondary protective device 480 has a ring shape that has an outer diameter 5 that corresponds to the outer diameter of the safety vent 410 and a predetermined width. The secondary protective device 480 is positioned on top of the current interruption means 420 and is coupled thereto to interrupt the flow of current when the temperature of the lithium rechargeable battery rises. The secondary protective device 480 may include a positive temperature coefficient (PTC) device, which has a device layer including a resin and carbon powder and conductive plates that are coupled with the top and bottom surfaces of the device layer. The resin in the resin layer expands when the temperature of the PTC device rises and breaks the connection between the carbon powder to interrupt the current. A ceramic device may be used as the PTC device.

The cap-up 490 is placed on top of the cap assembly 400 and is coupled thereto to conduct the current that is transferred from the lithium rechargeable battery to the exterior.

The current interruption means 420, referring to FIG. 4a and FIG. 4b, includes an outer ring 422 and a bimetal 424. The bimetal 424 contacts the top surface of the safety vent 410 when the lithium rechargeable battery functions normally and allows current to flow to the secondary protective device 480 or the cap-up 490. The bimetal 424 is actuated when the lithium rechargeable battery malfunctions and interrupts the current that flows from the safety vent 410 to the secondary protective device 480 or the cap-up 490.

The outer ring 422 has an outer diameter that corresponds to the safety vent 410, an inner diameter that is smaller than the protrusion 412, and a predetermined width. The outer ring 422 corresponds to the secondary protective device 480. The outer ring 422 comprises conductive metal and conducts the current that flows through the bimetal 424 to the secondary protective device 480 or the cap-up 490.

The bimetal 424 has a plate shape and includes upper and lower plates that are coupled with each other, and are made up of two metal plates that have different thermal expansion coefficients. The bimetal 424 extends across the protrusion of the safety vent 410 with an end that is coupled with the outer ring 422 and the other end that is coupled with the top of the safety vent 410 while being spaced at a predetermined distance from the outer ring 422. Specifically, the bimetal 424 may be slanted such that an end thereof is coupled with the outer ring 422 and the other end thereof is coupled with the top surface of the safety vent 410 while being positioned lower than the outer ring 422. As such, the bimetal 424 transmits the current that flows through the safety vent 410 to the secondary protective device 480 or the cap-up 490 via the outer ring 422.

The bimetal 424 includes a bimetal upper plate 425 comprising a metal and a Is bimetal lower plate 426 comprising a metal that has a lower thermal expansion coefficient than the bimetal upper plate 425. When the bimetal 424 is subjected to heat, it deforms upward due to the position of the bimetal lower plate 426 that has a smaller thermal expansion coefficient. The bimetal upper plate 425 may comprise various metals such as an alloy of iron and nickel. The bimetal lower plate 426 may comprise various metals that have a smaller thermal expansion 20 coefficient than the bimetal upper plate 425, including an alloy of copper and zinc, an alloy of nickel, manganese, and iron, an alloy of nickel, chromium, and iron, and an alloy of nickel, manganese, and copper, for example. As the metal 426 that has a smaller expansion coefficient, an alloy of nickel and iron may be used.

The bimetal 424 may include a bimetal upper plate 425 comprising an alloy of nickel and iron, which has an excellent degree of reaction at low temperatures, and a bimetal lower plate 426 comprising an alloy of nickel, manganese, and iron. When the heat generated within the rechargeable battery is transmitted to the bimetal 424, the bimetal 424 deforms upward and the other end thereof is moved away from the top surface of the safety vent 410. Thus, the current flowing from the safety vent 410 is interrupted.

The bimetal 424 may be actuated at about 50° C. to about 150° C., preferably at about 90° C. to about 120° C. The bimetal 424 may be actuated at 50° C. or higher, at which temperature malfunctions of lithium rechargeable batteries may occur, because lithium rechargeable batteries normally operate at 50° C. or less. It may be unnecessary to adapt the bimetal 424 to be actuated even at 150° C., because lithium rechargeable batteries may explode if the internal temperature is 150° C. or higher.

The bimetal 424 extends across the top of the protrusion 412 of the safety vent 410 and is lifted upward by the protrusion 412 when pressure builds up in the lithium rechargeable battery during a malfunction of the battery. The contact between the other end of the bimetal 424 with the top surface of the safety vent 410 is then released to interrupt the flow of current. Thus, the bimetal 424 is actuated when pressure builds up in the lithium rechargeable battery and interrupts the flow of current. Therefore, the bimetal 424 must be adapted to be deformed at a pressure that is less than the deformation pressure of the protrusion. The height of the bottom surface of one end of the bimetal 424 and that of the bottom surface of the other end thereof are determined so that the distance between the top surface of the other end of the bimetal 424 and the bottom surface of the outer ring 422 is greater than the height of the protrusion 412 of the safety vent 410, when it protrudes upward due to the internal pressure of the rechargeable battery.

The bimetal 424 may be about 0.1 mm to about 2.0 mm thick. If the thickness of bimetal 424 is less than 0.1 mm, it may be difficult to maintain the deformed state and the contact with the safety vent 410 may become unstable. If the thickness of the bimetal 424 is greater than 2.0 mm, it may be insensitive to temperature.

The bimetal 424 may be longer than the inner diameter of the outer ring 422. The top surface of the other end of the bimetal 424 is spaced at a predetermined distance from the bottom surface of the outer ring 422 so that when the bimetal 424 deforms upward, a predetermined region of the bimetal 424 contacts the bottom surface of the outer ring 422. The vertical distance between the top surface of the other end of the bimetal 424 and the bottom surface of the outer ring 422 is greater than the height of the protrusion 412 of the safety vent 410 when it is inverted and protrudes. This prevents the bimetal 424 from moving beyond the top of the outer ring 422 and contacting the secondary protective device 480 or the cap-up 490, even when the protrusion 412 of the safety vent 410 protrudes upward and lifts the bimetal 424. 15 Particularly, the current flowing through the safety vent 410 is prevented from flowing to the secondary protective device 480 or the cap-up 490 via the bimetal 424, even when the insulation plate 415 formed on top of the protrusion 412 is damaged.

Referring to FIG. 4a and FIG. 4b, the bimetal 424 may have the insulation plate 415 coupled with the bottom surface thereof. Particularly, the insulation 415 may be positioned on the bottom surface of the bimetal 424, not on the top surface of the protrusion 412 of the safety vent 410. The insulation plate 415 may also be coupled with both the protrusion 412 of the safety vent 410 and the bottom surface of the bimetal 424. When the insulation plate 415 is coupled with the bottom surface of the bimetal 424, however, it must have an area that corresponds to the protrusion lest it should interfere with the contact between the bimetal 424 and the safety vent 410.

FIG. 5 is a sectional view of a current interruption means according to another exemplary embodiment of the present invention.

As shown in FIG. 5, the current interruption means 420a may be configured such that a predetermined region on the other end of the bimetal 424a constitutes an approximately horizontal portion a. Particularly, the bimetal 424a has an approximately horizontal portion formed in a predetermined region on the other end thereof that contacts the top surface of the safety vent 410 to facilitate the contact between the bimetal 424a and the safety vent 410. As a result, the contact area between the bottom surface of the bimetal 424a and the top surface of the safety vent 410 increases as the electrical resistance decreases. The heat generated from within the rechargeable battery is then transmitted more rapidly and the reaction rate of the bimetal 424a increases.

FIG. 6 is a top view of a current interruption means according to another exemplary embodiment of the present invention.

As shown in FIG. 6, the current interruption means 420b may be configured such that the width of one end of the bimetal 424b is less than the width of the other end thereof. Particularly, the width of an end of the bimetal 424b that is coupled with the outer ring 422 is less than that of the other end thereof that contacts the top surface of the safety vent 410. As a result, the contact area between the bottom surface of the bimetal 424b and the top surface of the safety vent 410 increases as the electrical resistance decreases. Thus, the heat generated from within the rechargeable battery is then transmitted more rapidly and the reaction rate of the bimetal 424b increases.

FIG. 7 is a sectional view of a current interruption means according to another exemplary embodiment of the present invention.

As shown in FIG. 7, the current interruption means 420c may include a separate conductive film 430 that is formed on the bottom surface of the bimetal 424. The conductive film 430 is coupled with the bottom surface of the bimetal 424 with an end thereof being coupled with the outer ring 422 and the bottom surface of the other end of the conductive film 430 being in contact with the top surface of the safety vent 410. The conductive film 430 may have a size corresponding to the bimetal 424. The conductive film 430 may comprise a metal that has a lower electrical resistance than the bimetal 424 and comprise a material including, but not limited to copper, aluminum, silver, and nickel. As a conductive film with a lower electrical resistance is added to the bimetal 424, which is made up of an alloy that has a higher electrical resistance, any loss caused by electrical resistance is minimized when current flows. The conductive film 430 may be thinner than the bimetal 424 to avoid the decrease in the reaction rate of the bimetal 424 in response to temperature.

FIG. 8 is a sectional view of a current interruption means according to another exemplary embodiment of the present invention.

As shown in FIG. 8, the current interruption means 420d may additionally include a positive temperature coefficient (PTC) ceramic device layer 440 coupled with the bottom surface of the bimetal 424. The PTC ceramic device layer 440 may comprise a ceramic device that includes a barium titanate-based material. The PTC ceramic device layer 440 increases its electrical resistance and generates heat as temperature rises. The heat generated by the rising temperature of the PTC ceramic device layer 440 accelerates the temperature rise of the bimetal 424 and increases the operation rate of the bimetal 424.

At the start of a lithium rechargeable battery malfunction, it generally takes some time for the internal temperature of the lithium rechargeable battery to rise to the temperature at which the bimetal 424 begins to operate. Therefore, electricity flows through the lithium rechargeable battery during that period of time and affects the electrode assembly and the protective circuit. This shortens the service life of the lithium rechargeable battery. However, if the PTC ceramic device layer 440 rapidly generates resistance heat as temperature rises and quickly increases the temperature of the bimetal 424, it can be actuated in a short period of time. This minimizes the duration of electricity flow through the lithium rechargeable battery and avoids any damage to the electrode assembly and the protective circuit of the rechargeable battery, as well as any shortening of the service life of the rechargeable battery.

The PTC ceramic device layer 440 may be formed on the top surface of the bimetal 424 or in the middle portion thereof. When the electrical resistance of the PTC ceramic device layer 440 is higher than that of the bimetal 424, the PTC ceramic device layer 440 may be omitted from the portion where the bimetal 424 contacts the top surface of the safety vent 410 or a separate conductive film may be formed on the portion.

FIG. 9 is a sectional view of a current interruption means according to another exemplary embodiment of the present invention.

As shown in FIG. 9, the current interruption means 420e may include a separate elastic body 450 that is positioned between the top surface of the bimetal 424 and the bottom surface of the outer ring 422. The elastic body 450 applies a predetermined force to the top of the other end of the bimetal 424 for more secure electrical contact between the other end of the bimetal 424 and the top surface of the safety vent 410. The elastic body 450 may comprise a conductive substance so that, when the current that flows through the safety vent 410 flows to the outer ring 422 via the elastic body 450, the electrical resistance of the current interruption means 420e decreases. Thus, the elastic body 450 is preferably a leaf spring or a coil spring comprising a conductive metal. The compression pressure of the elastic body 450 may be determined such that the elastic body 450 can be compressed at a lower pressure than both the deformation pressure of the bimetal 424 due to a change in temperature and the deformation pressure of the protrusion 412 of the safety vent 410.

FIG. 10 is a sectional view of a current interruption means according to another exemplary embodiment of the present invention.

As shown in FIG. 10, the current interruption means 420f may be configured such that the bimetal 424f is shorter than the inner diameter of the outer ring 422 and is adapted to contact the top surface of the safety vent 410 across the protrusion 412. As such, the bimetal 424f can be sufficiently lifted to interrupt current. When the protrusion 412 of the safety vent 410 is higher than the height of the insulation ring 460, particularly the height of the top surface of the safety vent 410 and the bottom surface of the outer ring 422, the bimetal 424f can be sufficiently lifted toward the top of the outer ring 422 to interrupt current. In this case, the portion of the bimetal 424f that contacts the top surface of the safety vent 410 may be configured as a horizontal portion b.

FIG. 1 is a sectional view of a current interruption means according to another exemplary embodiment of the present invention.

As shown in FIG. 11, the current interruption means 420g may be configured such that the bottom surface of an end of the bimetal 424g is coupled with the top surface of the outer ring 422. Although an end of the bimetal 424 contacts the inner surface of the outer ring 422 according to the above-mentioned embodiments, the bimetal 424 may not be easily coupled as desired when it has a small thickness. Therefore, the bimetal 424g may be coupled to the top surface of the outer ring 422 while overlapping it in a predetermined region, depending on the thickness. However, the size of the outer ring 422 and the area thereof that overlaps the bimetal 424g may be adjusted because the bimetal 424g may interfere with the secondary protective device 480 or the cap-up 490.

FIG. 12 is a sectional view of a current interruption means according to another exemplary embodiment of the present invention.

As shown in FIG. 12, the current interruption means 420h may be configured such that the top surface of an end of the bimetal 424h may be coupled with the bottom surface of the outer ring 422. The size of the outer ring 422 and the area thereof that overlaps the bimetal 424h may be adjusted because the bimetal 424h may interfere with the secondary protective device 480 or the cap-up 490 as described with reference to FIG. 11.

FIG. 13a and FIG. 13b are top and sectional views, respectively, of a current interruption means according to another exemplary embodiment of the present invention.

As shown in FIG. 13a and FIG. 13b, the current interruption means 420i according to another exemplary embodiment of the present invention may include a contractible film 428 that has a cutout 428a formed on a predetermined part thereof and an end that is retained between the outer ring 422 and the insulation ring 460. More specifically, the contractible film 428 is a thermal contractible film that undergoes a contraction of about 25% to about 75% of the initial length at a temperature of about 90° C. to about 150° C. The contraction temperature and the degree of contraction may be modified by adjusting the composition of the thermal contractible film. The contractible film 428 has a cutout 428a formed on a predetermined part thereof to allow the bimetal 424, which is fixed to the outer ring 422, to contact the top surface of the safety vent 410. Although the contractible film 428 is shown to have a "U" shape in FIG. 13a, the shape is not limited herein. For example, the contractible film may have various shapes including "L," "D," and "O." The incision 428a has a shape that is determined by the contractible film so that the bimetal 424 can contact the top surface of the safety vent 410.

When the temperature of the lithium rechargeable battery rises due to a malfunction, the bimetal is actuated and interrupts the flow of current in the lithium rechargeable battery. The temperature of the lithium rechargeable battery then returns to the normal range. When the internal temperature of the lithium rechargeable battery becomes normal, the bimetal returns to the initial position and allow current to flow in the rechargeable battery, which is then ready for reuse. If the temperature of the lithium rechargeable battery rises to 90° C. or higher, however, the lithium rechargeable battery cannot be reused even when the temperature thereof returns to normal. If the bimetal returns to its initial position and allows current to flow in the lithium rechargeable battery in this case, the lithium rechargeable battery experiences repeated rises and falls and generates gas therein. As a result, there is a possibility of explosion.

The contractible film 428 contracts about a fixed side thereof when the temperature of the lithium rechargeable battery rises and is positioned below the bimetal 424 together with the movement of the cutout 428a to insulate the bimetal 424 and the safety vent 410 from each other. Accordingly, no current flows in the lithium rechargeable battery and the safety thereof is secured.

FIG. 14 is a partial sectional view of a cylindrical lithium rechargeable battery showing the operation of a current interruption means according to an exemplary embodiment of the present invention.

As shown in FIG. 14, the cylindrical lithium rechargeable battery has an electrode assembly 200 contained in a cylindrical can 300 and a cap assembly 400 that is coupled with the top opening of the can 300 to seal the cylindrical can 300 via a gasket 470. The cap assembly 400 is formed by laminating a safety vent 410, a current interruption means 420, a secondary protective device 480, and a cap-up 490. The cap assembly 400 is coupled with the top of the cylindrical can 300 while being compressed in the vertical direction together with a gasket 470 that is coupled to the outer surface thereof. The current interruption means 420 is adapted to interrupt the flow of current by means of heat, as mentioned above, and the secondary protective device 480 may be omitted if necessary.

During normal operation of the cylindrical lithium rechargeable battery, the current that is generated from the electrode assembly 200 flows to the safety vent 410 via an electrode tab 215 that is coupled with the bottom surface of the safety vent 410.

Since the current interruption means 420 is positioned on and coupled with the top surface of the safety vent 410, the current that flows to the safety vent 410 flows to the outer ring 422 via the other end of the bimetal 424 which contacts the top surface of the safety vent 410. The secondary protective device 480 is positioned on and coupled with top of the outer ring 422 of the current interruption means 420 and allows current to flow. The cap-up 490 is coupled with the top of the secondary protective device 480 and causes the current that is flowing from the secondary protective device 480 to flow to the exterior. If the secondary protective device 480 is not used, the current from the current interruption means 420 directly flows to the cap-up 490.

In the case of an abnormal operation such as overcharging or over-discharging of the lithium rechargeable battery, however, gas is generated in the lithium rechargeable battery and pressure builds up. The pressure buildup in the lithium rechargeable battery causes the protrusion 412 of the safety vent 410 to deform upward. The protrusion 412 then contacts the bottom surface of the bimetal 424 and subjects it to a pressure. The bimetal 424 deforms upward when it is subjected to a pressure. The bimetal 424 then moves away from the top surface of the safety vent 410 and interrupts the current that flows from the safety vent 410. The insulation plate that is positioned on the top surface of the protrusion 412 interrupts the flow of current between the protrusion 412 and the bimetal 424. As such, the current interruption means 420 interrupts the current that flows from the safety vent 410.

When the temperature of the lithium rechargeable battery rises due to an abnormal operation, the temperature of the bimetal 424 rises and the bimetal 424 deforms upward due to the difference in the thermal expansion coefficient between its upper and lower plates. Particularly, the other end of the bimetal 424 deforms upward relative to an end thereof that is coupled with the outer ring 422. The other end of the bimetal 424 loses contact with the top surface of the safety vent 410 and interrupts the current that flows from the safety vent 410.

The secondary protective device 480 that is coupled with the top of the current interruption means 420 also interrupts current using the heat that is generated from within the lithium rechargeable battery. As such, current can be interrupted in a two-fold manner.

When the internal pressure builds up or the internal temperature rises due to gas generated in the lithium rechargeable battery, the current interruption means 420 interrupts the overall flow of current in the cap assembly 400. The chemical reactions occurring in lithium rechargeable battery then cease.

It is obvious to those skilled in the art that, although the present invention has been described with reference to a cylindrical lithium rechargeable battery in the above embodiments, the present invention can be applied to other lithium rechargeable batteries which are not of a cylindrical type, as well as to other rechargeable batteries which are not lithium rechargeable batteries.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   a cap assembly comprising a cap-up, a safety vent having a protrusion that protrudes downward from the center thereof and which is deformed upward by the internal pressure of the battery, and a current interruption means that is positioned on top of the safety vent,
   wherein the current interruption means comprises an outer ring comprising a conductive metal and a bimetal that extends across the top of the protrusion with an end being coupled with the outer ring and the other end being in contact with the top surface of the safety vent, an insulation plate having a size corresponding to the protrusion of the safety vent that is positioned on top of the protrusion, and an insulating ring that is positioned between the safety vent and the outer ring with a predetermined height while being spaced a predetermined distance from the outer side of the insulation plate.

2. The rechargeable battery of claim 1,
wherein the bimetal has a lower deformation pressure than the deformation pressure of the protrusion of the safety vent.

3. The rechargeable battery of claim 1,
wherein the bimetal has a thickness of about 0.1 mm to about 2.0 mm.

4. The rechargeable battery of claim 1,
wherein the bimetal comprises a bimetal upper plate and a bimetal lower plate comprising a metal that has a larger expansion coefficient than that of the bimetal upper plate.

5. The rechargeable battery of claim 4,
wherein the bimetal upper plate comprises an alloy of nickel and iron.

6. The rechargeable battery of claim 4,
wherein the bimetal lower plate comprises one selected from the group consisting of an alloy of copper and zinc, an alloy of nickel and manganese or iron, an alloy of nickel, chromium, and iron, and an alloy of nickel, manganese, and copper.

7. The rechargeable battery of claim 1,
wherein the bimetal is actuated at about 50° C. to about 150° C.

8. The rechargeable battery of claim 1,
wherein the bimetal is actuated at about 90° C. to about 120° C.

9. The rechargeable battery of claim 1,
wherein the bimetal is longer than the inner diameter of the outer ring and the top surface of the other end of the bimetal is spaced a predetermined distance from the bottom surface of the outer ring so that a predetermined region contacts the bottom surface of the outer ring when the bimetal is moved upward.

10. The rechargeable battery of claim 9,
wherein the height of the bottom surface of an end of the bimetal and that of the bottom surface of the other end thereof are determined such that the distance between the top surface of the other end of the bimetal and the bottom surface of the outer ring is larger than the height of the protrusion of the safety vent when it is inverted and protrudes.

11. The rechargeable battery of claim 9,
wherein the bimetal comprises a horizontal portion that is formed horizontally in a predetermined region on the other end thereof which contacts the top surface of the safety vent.

12. The rechargeable battery of claim 1,
wherein an end of the bimetal that is coupled with the outer ring is less wide than the other end.

13. The rechargeable battery of claim 1,
wherein the bimetal further comprises a conductive film that is formed on the bottom surface thereof comprising a metal that has a lower electrical resistance than metal constituting the bimetal, with an end being coupled with the outer ring and the other end contacting the top surface of the safety vent.

14. The rechargeable battery of claim 13,
wherein the conductive film comprises metal selected from the group consisting of copper, aluminum, silver, and nickel.

15. The rechargeable battery of claim 13,
wherein the conductive film is thinner than the bimetal.

16. The rechargeable battery of claim 1,
wherein the current interruption means further comprises an elastic body that is coupled between the top surface of the other end of the bimetal and the bottom surface of the outer ring, which overlap each other on the same plane.

17. The rechargeable battery of claim 16,
wherein the elastic body has a compression pressure which is smaller than the deformation pressure of the bimetal.

18. The rechargeable battery of claim 16,
wherein the elastic body is a leaf spring or a coil spring that comprises a conductive metal.

19. The rechargeable battery of claim 1, further comprising:
a positive temperature coefficient (PTC) ceramic device layer formed in the shape of a thin plate on the bottom or top surface of the bimetal.

20. The rechargeable battery of claim 19,
wherein the PTC ceramic device layer is made up of barium titanate-based material.

21. The rechargeable battery of claim 1,
wherein the current interruption means further comprises a contractible film comprising thermal contractible film of a predetermined shape, wherein an end of the contractible film is retained between the outer ring and the insulation ring,
wherein the contractible film has a cutout formed thereon in a predetermined shape so that the bimetal contacts the safety vent, and
wherein the contractible film contracts about a fixed side thereof when the temperature of the lithium rechargeable battery rises to insulate the bimetal and the safety vent from each other.

22. The rechargeable battery of claim 21,
wherein the contractible film has an "L," "U," "D," or "O" shape.

23. The rechargeable battery of claim 21,
wherein the contractible film comprises a thermal contractible film that contracts to about 25% to about 75% of the initial size at a temperature of about 90° C. to about 150° C.

24. The rechargeable battery of claim 1,
wherein the bimetal is shorter than the inner diameter of the outer ring so that the other end thereof can rise above the bottom surface of the outer ring.

25. The rechargeable battery of claim 24,
wherein the bimetal has a horizontal portion that is formed horizontally in a predetermined region thereof that contacts the top surface of the safety vent.

26. The rechargeable battery of claim 1,
wherein the top or bottom surface of an end of the bimetal is coupled with the top or bottom surface of the outer ring.

27. The rechargeable battery of claim 1,
wherein the insulation pate is coupled with the top surface of the protrusion of the safety vent.

28. The rechargeable battery of claim 1,
wherein the insulation plate is coupled with the bottom surface of the bimetal in a region corresponding to the protrusion.

29. The rechargeable battery of claim 1,
wherein the insulation plate comprises of a material selected from the group consisting of polypropylene, polyimide, polyphenylene sulfide, and Nylon 66.

30. The rechargeable battery of claim 1,
wherein the insulation ring has an outer diameter that corresponds to the outer ring and an inner diameter that is spaced at a predetermined distance from the other end of the bimetal.

31. The rechargeable battery of claim 1,
wherein the insulation ring has a smaller height than the height between the bottom surface of the outer ring and the bottom surface of the other end of the bimetal contacting the top surface of the safety vent.

32. The rechargeable battery of claim 1,
wherein the insulation ring comprises a material selected from the group consisting of polypropylene, polyimide, polyphenylene sulfide, and Nylon 66.

33. The rechargeable battery of claim 1,
wherein the cap assembly further comprises a second protective device coupled with the top of the safety vent.

34. The rechargeable battery of claim 33,
wherein the second protective device is a PTC device comprising a composite material of a resin and carbon powder.

* * * * *

UNITED STATES PATENT AND TRADEMARK OFFICE
CERTIFICATE OF CORRECTION

PATENT NO.       : 7,601,455 B2         Page 1 of 1
APPLICATION NO.  : 11/272094
DATED            : October 13, 2009
INVENTOR(S)      : Jang Ho Yoon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Fifth Day of October, 2010

David J. Kappos
*Director of the United States Patent and Trademark Office*